(No Model.)
N. BURGESS.
STAGE APPARATUS.
No. 442,796.  Patented Dec. 16, 1890.
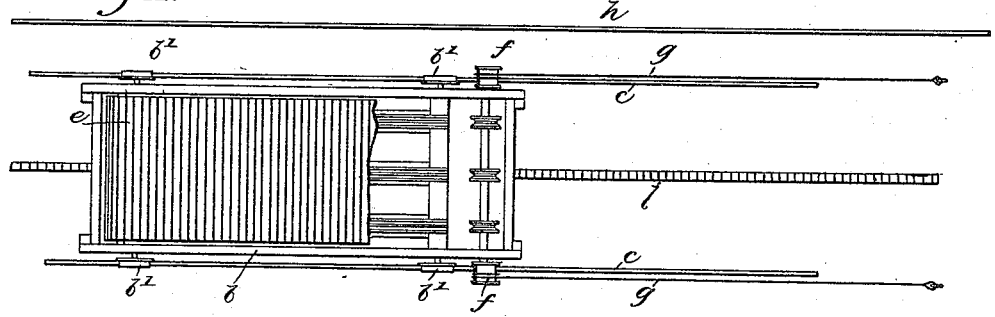
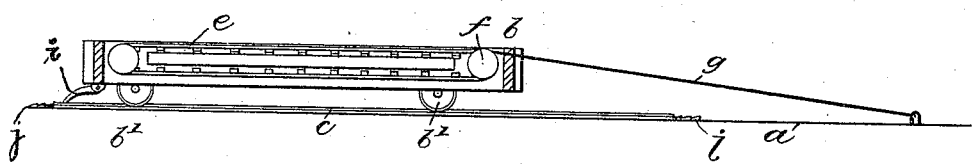
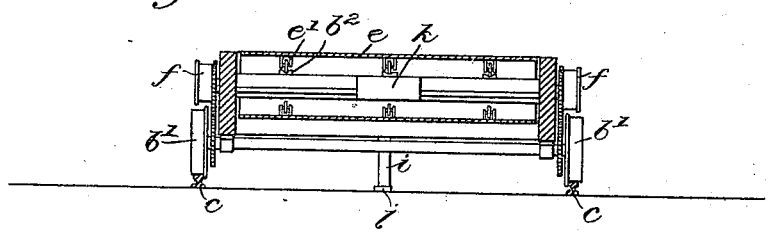
WITNESSES
INVENTOR
Neilson Burgess.
by Simonds & Burdett,
Attorneys

UNITED STATES PATENT OFFICE.

NEILSON BURGESS, OF HIGHLANDS, NEW JERSEY.

STAGE APPARATUS.

SPECIFICATION forming part of Letters Patent No. 442,796, dated December 16, 1890.

Application filed November 18, 1890. Serial No. 371,877. (No model.)

*To all whom it may concern:*

Be it known that I, NEILSON BURGESS, of Highlands, in the county of Monmouth and State of New Jersey, have invented certain new and useful Improvements in Stage Apparatus, of which the following is a full, clear, and exact description, whereby any one skilled in the art can make and use the same.

The object of my invention is to provide in an apparatus that is adapted for use on a stage means for utilizing the motion of the horse or other moving animal mounted on the apparatus to determine and control the progressive movement of the carriage across the stage.

My invention consists in the combination of the several parts making up the apparatus as a whole, and in the details of construction of such parts, as more particularly herein-after described, and pointed out in the claims.

Referring to the drawings, Figure 1 is a top or plan view of one of the carriages and the connecting mechanism for moving the carriage. Fig. 2 is a detail view in side elevation of the same. Fig. 3 is a detail view in rear elevation with parts cut away to show construction.

My invention is described with particular reference to the stage of a theater, for use on which my invention is particularly adapted, although the apparatus is not limited to any particular place nor to any special and particular details of construction so long as the several parts are so combined and arranged that the main idea of utilizing the motion of the endless path on which the moving animal is supported to control the progressive movement of the carriage is embodied in the structure.

In the accompanying drawings, the letter $a$ denotes a stage, on which a moving carriage $b$ is supported. The carriage is preferably provided with wheels $b'$, that run on tracks $c$, that may be laid upon the surface of the stage or supported on a frame-work below the level of the stage, the carriage running in that case in a long trap that extends the requisite distance across the stage. This carriage $b$ supports on suitable rollers the endless path or revolving stage that is, preferably, composed of a number of lags suitably united to each other or secured to a flexible belt, forming a sort of endless apron or path of considerable width to support a moving object, as a horse.

In case the carriage is to be adapted to illustrate a scene in which a horse is apparently to cross the stage more or less rapidly, the several parts described are constructed of a strength adapted to support the horse, and the endless path $e$ may be supported on the carriage either on slides $e'$, that run on tracks $b^2$, that are secured along the top of the carriage, or rollers may be used, the main requisite being that the path shall be properly supported on the carriage to enable it to move rapidly underneath the feet of the horse and move backward as the horse steps, something in the same manner as the belt on a treadmill operates.

On the carriage there is supported a pulley or drum $f$, that is rotated by the movement of the endless path $e$, and on this drum a rope $g$ or like flexible connecting part is adapted to be wound, the outer end of the rope being made fast to a fixed point in advance of the carriage, the object being to cause the carriage to be moved forward by the winding up of the rope upon the drum or pulley that is driven by the movement of the path or belt. By establishing a connection between the belt and a fixed point beyond the carriage it is evident that the forward movement of the carriage may be governed by the movement of the belt, and the rate of movement of the carriage will be determined by the relative rate of movement of the belt—that is, the faster the horse goes when mounted upon the endless path the faster will the carriage be moved forward. By regulating the size of the drum and length of rope or like connecting means with reference to the movement of the path it is evident that any desired time may be consumed in causing the carriage to be moved across the stage while the horse is in motion on the endless path, and a race either against time or between several horses mounted on different carriages may be run.

The main idea of my invention is to control and determine through the medium of the connecting part the rate of movement of the carriage by the movement of the path supported on the carriage.

The within apparatus has been described with particular reference to a carriage adapted to support a horse, although my invention is adapted for use in apparatus where other animals or moving objects may be employed, suitable means—such as have already been described in prior patents issued to me—being used to hold the horse or other animal in position on the moving path while in motion.

This apparatus is preferably and usually employed to illustrate a race scene on a stage that is provided with suitable scenery as a background $h$, that may consist, if desired, of a movable panoramic scene, and other stage settings appropriate to the scene may also be employed.

It has been found in the use of a carriage of this description that there is a tendency of the carriage to recoil under the blow of the hoof when a horse is running on the endless path, and in order to prevent any backward movement of the carriage owing to such recoil a rack $j$ is secured along the pathway, and a pawl $i$, supported on the carriage, has its lower end in engagement with the teeth of the rack, so that any backward movement of the carriage is prevented, the pawl moving from tooth to tooth as the carriage is moved forward.

In order to aid in the progressive movement of the carriage a spring-motor $k$ may be connected to the supporting-wheels of the carriage, so that the operation of such motor may cause the carriage to be moved forward, and thus take from the horse or like animal supported on the carriage the labor of propelling the whole weight of the carriage.

It is evident that other means than the simple drum and rope may be employed to produce the desired result without departing from the main feature of my invention, and I do not limit myself to the specific means herein described for accomplishing this result.

I claim as my invention—

1. In combination with a supporting-track, a carriage movable thereon, an endless path supported on said carriage, and means whereby the progressive movement of the carriage is controlled by the movement of the endless path, all substantially as described.

2. In combination with a stage, a track or guideway for a carriage, a movable carriage mounted on such guideway, an endless path supported on said carriage, a pulley or drum in operative connection with the moving path, and a rope or like flexible connection extending from said drum to a fixed point beyond the carriage, all substantially as described.

3. In combination with a stage, a background scene, a movable carriage supported in operative connection with the stage, an endless path borne on the carriage, and means, substantially as described, for controlling the forward movement of the carriage by the movement of the endless path, all substantially as described.

4. In combination with a stage, a movable carriage mounted thereon, a detent device extending between the carriage and its support, an endless path mounted on the carriage, and means, substantially as described, for imparting progressive movement to the carriage through the movement of the endless path, all substantially as described.

5. In combination with a stage, a movable carriage mounted thereon, a motor or like device supported on the carriage in operative connection with the supporting-wheels, an endless path supported on the carriage, a pulley or drum in operative connection with the endless path, and a rope or like part extending from the drum to a fixed point beyond the carriage, all substantially as described.

NEILSON BURGESS.

Witnesses:
CHAS. L. BURDETT.
JEFFERSON PATTEN.